United States Patent
Guillois

(10) Patent No.: US 11,486,332 B2
(45) Date of Patent: Nov. 1, 2022

(54) AIRCRAFT JET ENGINE NACELLE, PROPULSION ASSEMBLY AND AIRCRAFT COMPRISING SUCH A NACELLE

(71) Applicant: Safran Nacelles, Gonfreville l'Orcher (FR)

(72) Inventor: Denis Guillois, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 218 days.

(21) Appl. No.: 16/446,683

(22) Filed: Jun. 20, 2019

(65) Prior Publication Data
US 2019/0331057 A1     Oct. 31, 2019

Related U.S. Application Data

(63) Continuation of application No. PCT/FR2017/053722, filed on Dec. 20, 2017.

(51) Int. Cl.
*F02K 1/56* (2006.01)
*B64D 29/00* (2006.01)
*F02K 1/60* (2006.01)

(52) U.S. Cl.
CPC .............. *F02K 1/563* (2013.01); *B64D 29/00* (2013.01); *F02K 1/605* (2013.01)

(58) Field of Classification Search
CPC .......... B64D 29/00; F02K 1/563; F02K 1/605
See application file for complete search history.

(56) References Cited

U.S. PATENT DOCUMENTS

| | | | | |
|---|---|---|---|---|
| 3,020,712 A | * | 2/1962 | Dolliver | F02K 1/40 239/265.17 |
| 3,616,648 A | * | 11/1971 | Weise | F02K 1/605 60/226.2 |
| 3,837,578 A | | 9/1974 | Leibach | |
| 4,462,207 A | | 7/1984 | Hitchcock | |
| 5,176,340 A | * | 1/1993 | Lair | F02K 1/605 239/265.19 |

(Continued)

FOREIGN PATENT DOCUMENTS

| | | | | |
|---|---|---|---|---|
| DE | 1931747 A1 | * | 1/1971 | ............. F02K 1/605 |
| DE | 2252208 B1 | * | 6/1973 | ............. F02K 1/563 |

(Continued)

OTHER PUBLICATIONS

International Search Report for International Application PCT/FR2017/053722, dated Apr. 6, 2018.

*Primary Examiner* — Assres H Woldemaryam
*Assistant Examiner* — Aaron M Rodziwicz
(74) *Attorney, Agent, or Firm* — Burris Law, PLLC

(57) ABSTRACT

A nacelle for an aircraft turbofan includes a rear section including a thrust reversal device having an upper door and a lower door, the upper and lower doors being mobile in rotation between a stowed position in which they are aerodynamically continuous with the rest of the nacelle and a deployed position in which the upper and lower doors are able to redirect forward the core and bypass flows produced by the jet engine, each door being moved from one position to the other by at least one dedicated actuator. The opening angle (X) of the upper door in the deployed position is smaller than the opening angle (Y) of the lower door.

7 Claims, 3 Drawing Sheets

(56) References Cited

U.S. PATENT DOCUMENTS

| | | | |
|---|---|---|---|
| 5,230,213 A * | 7/1993 | Lawson | F02K 1/563 |
| | | | 60/226.2 |
| 5,699,966 A * | 12/1997 | Beverage | F02K 1/006 |
| | | | 239/265.19 |
| 5,875,995 A * | 3/1999 | Moe | F02K 1/70 |
| | | | 244/110 B |
| 6,311,928 B1 * | 11/2001 | Presz, Jr. | B64D 33/04 |
| | | | 239/265.29 |
| 8,051,639 B2 | 11/2011 | Lair | |
| 2009/0127390 A1 * | 5/2009 | Lair | F02K 1/60 |
| | | | 244/110 B |
| 2014/0239083 A1 * | 8/2014 | Suciu | B23P 19/04 |
| | | | 239/11 |
| 2015/0121896 A1 * | 5/2015 | Suciu | F02C 6/206 |
| | | | 60/796 |

FOREIGN PATENT DOCUMENTS

| | | | | |
|---|---|---|---|---|
| EP | 43764 | * | 1/1982 | |
| EP | 763653 | * | 3/1997 | |
| EP | 0763653 A1 | * | 3/1997 | F02K 1/563 |
| EP | 3196453 A1 | * | 7/2017 | F01D 25/28 |
| EP | 3696396 A1 | * | 8/2020 | F02K 1/763 |
| FR | 1423320 A | * | 1/1966 | F02K 1/60 |
| FR | 2695435 A1 | * | 3/1994 | F02K 1/563 |
| GB | 1130268 A | * | 10/1968 | F02K 1/605 |
| GB | 2075447 | * | 11/1981 | |
| GB | 2075447 A | * | 11/1981 | F02K 1/563 |
| GB | 2188886 | * | 10/1987 | |
| WO | 1998055754 | | 12/1998 | |

* cited by examiner

AIRCRAFT JET ENGINE NACELLE, PROPULSION ASSEMBLY AND AIRCRAFT COMPRISING SUCH A NACELLE

CROSS-REFERENCE TO RELATED APPLICATIONS

This application is a continuation of International Application No. PCT/FR2017/053722, filed on Dec. 20, 2017, which claims priority to and the benefit of FR 16/62940 filed on Dec. 20, 2016. The disclosures of the above applications are incorporated herein by reference.

FIELD

The present disclosure relates to a turbojet engine nacelle equipped with a rear door thrust reverser, an aircraft propulsion unit and an aircraft including a nacelle.

BACKGROUND

The statements in this section merely provide background information related to the present disclosure and may not constitute prior art.

A nacelle for a bypass-type turbojet engine is typically equipped with a fan located upstream of the engine and ensuring the circulation of a cold air flow in an annular channel called secondary flow path and surrounding the gas generator. A nacelle for a turbojet engine of the aforementioned type includes the cold air flow (or secondary flow) and the hot gas flow (or primary flow) meeting in a downstream passage of substantially circular section before being ejected together.

In a more specific manner, such a nacelle for a bypass turbojet engine incorporates a thrust reverser system including two doors each having an upstream edge and a downstream edge, with reference to the flowing direction of gases, said doors being disposed downstream of the nacelle and each being pivotally mounted about hinge axes between a stowed position (not interfering with the direct jet gas ejection), and a deployed position (causing the thrust reversal) in which said doors ensure forward redirection of the primary and secondary flows.

A thrust reverser assembly of this type is already known in particular by the application WO 98/55754. This type of thrust reverser generally equips nacelles for small-sized turbojet engines, such as for example those mounted on the fuselage of business aircrafts. In such a configuration, during the phases of deployment of the thrust reversers, the forward thrust generated by the turbojet engines, due to the position thereof, induces a nose-up pitching moment. Thus, the action of the thrust reversers tends to lift the nose of the aircraft, which is of course harmful to the proper control thereof. It is therefore necessary to provide a configuration such that the thrust of the turbojet engines in the thrust reversal phase generates a nose-down moment and not a nose-up moment.

A solution to this issue is known from U.S. Pat. No. 8,051,639. The solution proposed in this document consists in providing thrust reverser doors offset along the longitudinal axis of the engine in the deployed position, enabling a part of the gas flow from the engine to escape backward and downward. This part thus generates a thrust directed towards the rear of the aircraft and towards the ground, thus inducing a nose-down moment, since this thrust is generated at a point located behind the center of gravity of the aircraft.

This solution, however, has the disadvantage that the thrust generating this nose-down moment is also directed rearward, thus reducing the overall efficiency of the thrust reverser. Furthermore, the offset position (along the longitudinal axis of the engine) of the thrust reverser doors constitutes a complex architecture, which makes the design of such an assembly difficult. Finally, such a configuration can degrade the aerodynamic qualities of the assembly when the thrust reverser doors are in the deployed position.

SUMMARY

The present disclosure provides a nacelle for an aircraft bypass turbojet engine, including a rear section, a thrust reverser device, the thrust reverser system including an upper door and a lower door, the doors being movable in rotation between a stowed position, in which they provide an aerodynamic continuity with the rest of the rear section, and a deployed position, in which the doors are capable of redirecting forward the primary and secondary flows generated by the turbojet engine, each door being displaced from one position to the other by at least one dedicated actuator, the opening angle of the upper door in the deployed position being less than the opening angle of the lower door.

Thus, by providing an opening angle for the lower door larger than for the upper door, the sum of the counter-thrusts generated by both doors includes a vertical component directed downward. During the thrust reversal phases, this vertical component induces on the propulsion unit an upward directed force which, when the propulsion unit is located at the rear of the fuselage of an aircraft, generates a nose-down pitching moment. In addition, the differentiated opening of both doors can be obtained simply by a differentiated stroke of the actuators respectively dedicated to each door. This differentiated opening is thus obtained in a simple and reliable manner, and in any case without causing loss of efficiency of the thrust reverser device. Moreover, the symmetrical positioning of the doors (relative to a plane containing the longitudinal axis of the engine), constitutes a simpler architecture and having better aerodynamic qualities when the doors are in the deployed position (even if their opening is asymmetrical).

In one form, the stroke of the upper actuator, actuating the upper door, is smaller than the stroke of the lower actuator, actuating the lower door.

In another form, the difference in opening angle between the lower and upper doors is between 3° and 10°.

In another form, the difference in opening angle between the lower and upper doors is between 4° and 6°.

In yet another form, the lower and upper doors are movable in rotation about respective axes, these axes of rotation being symmetrical relative to the longitudinal axis of the nacelle.

The present disclosure also concerns an aircraft propulsion unit, including a bypass turbojet engine, the propulsion unit including a nacelle as defined above.

Further, the present disclosure relates to an aircraft including at least one propulsion unit as defined above, the propulsion unit being attached to the fuselage of the aircraft, in the rear position relative to the center of gravity of the aircraft.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3a is a side view of FIG. 2a; and

Figure 1:
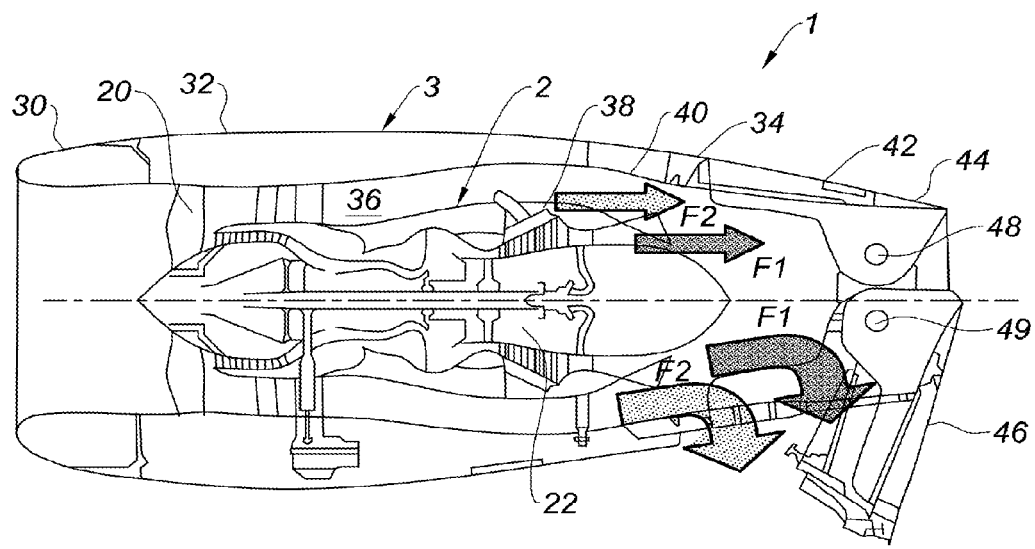
FIG. 1 is a cross-sectional view of a propulsion unit equipped with a nacelle in which the upper door of the thrust reverser is shown in the "direct jet" configuration and the lower door being shown in the "reverse jet" configuration according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a propulsion unit 1 in accordance with the present disclosure, provided to be disposed on the fuselage of an aircraft, at the rear thereof.

The propulsion unit 1 includes a bypass turbojet engine 2 equipped with a nacelle 3. The nacelle 3 includes, in a conventional manner, an air inlet 30, a median section 32 (surrounding in particular a fan 20 of the turbojet engine 2), as well as a rear section 34. As shown in FIG. 1 the turbojet engine 2 is capable of generating, via the gas generator 22, a hot gas flow F1, called primary flow, and, via the fan 20 a cold air flow F2, called secondary flow, which circulates outside the turbojet engine 2, through an annular channel called secondary flow path 36. The secondary flow path 36 is delimited between an inner fixed structure 38 and an outer fixed structure 40 of the nacelle 3. Both air flows F1 and F2 are ejected from the propulsion unit 1 from the rear of the nacelle.

The rear section 34 integrates a thrust reverser device 42 and is terminated by an ejection nozzle whose outlet is located downstream of the turbojet engine. The thrust reverser device 42 comprises two doors, an upper door 44 and a lower door 46, which are pivotally mounted so as to be able, under the action of driving means, to switch between a stowed position corresponding to a direct jet configuration, and a deployed position, corresponding to a reverse jet configuration. In the stowed position (position in which the upper door 44 is shown), the doors 44, 46 provide, with a fixed structure of the rear section 34, an aerodynamic continuity with the rest of the nacelle. In the deployed position (position in which the lower door 46 is shown), the doors 44, 46 are deployed so that each door at least partially obstructs the ejection nozzle of the propulsion unit, thus redirecting forward the primary F1 and secondary F2 flows. The movement of the doors 44, 46 from one position to another is performed by rotation about a respective axis of rotation 48, 49, the axes of rotation 48, 49 being symmetrical relative to the longitudinal axis of the engine.

Figure 2A:
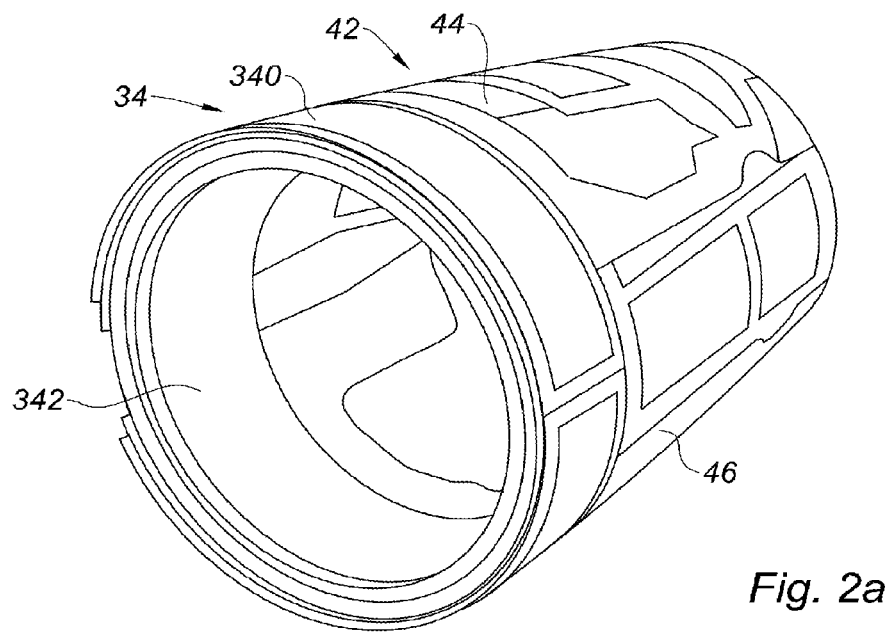
FIG. 2a is a partial perspective view of the nacelle of FIG. 1 showing the rear section with the thrust reverser system in the retracted position.
Figure 2B:
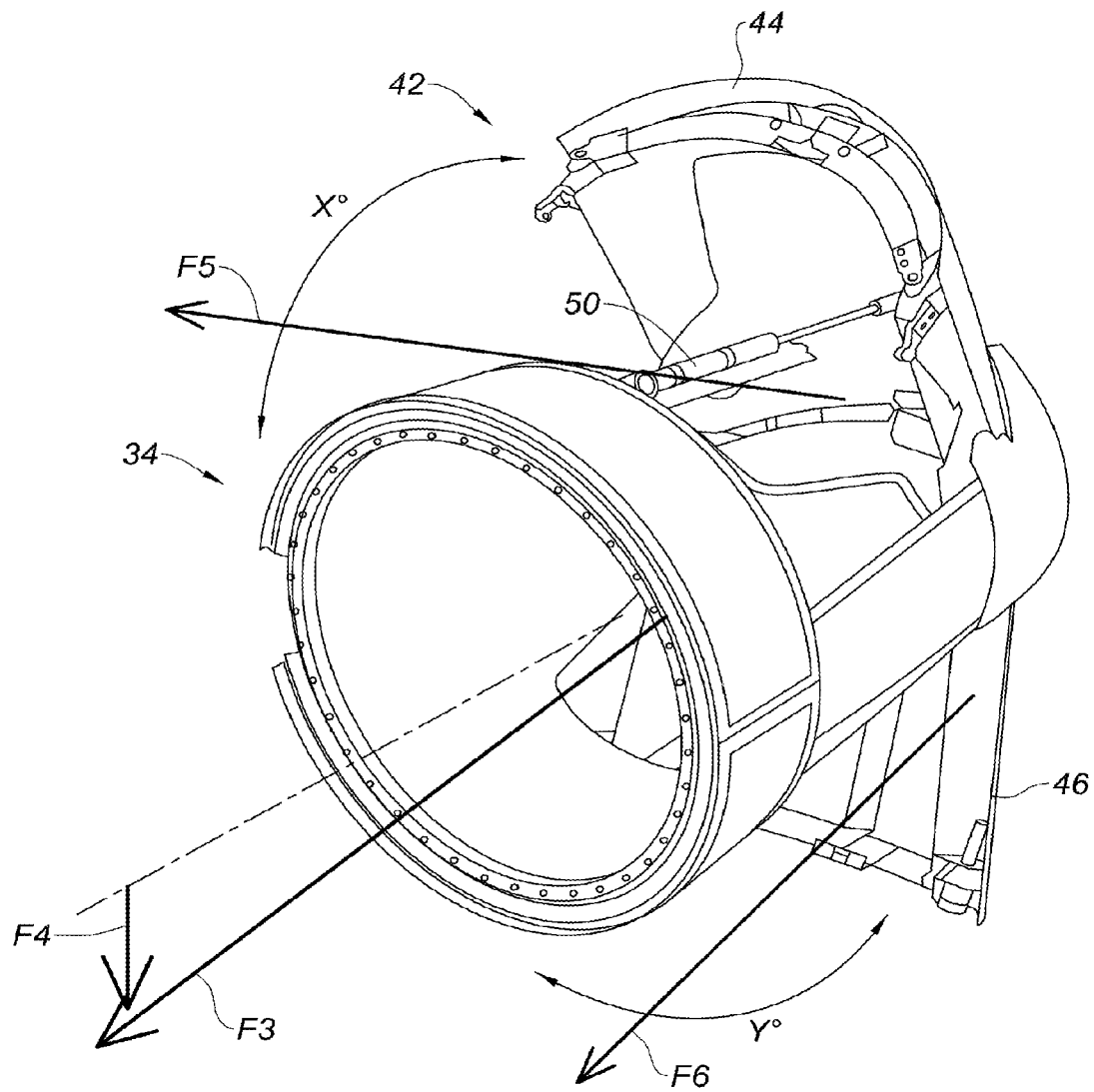
FIG. 2b is a partial perspective view of the nacelle of FIG. 1 showing the rear section with the thrust reverser system in the deployed position.
Figure 3A:
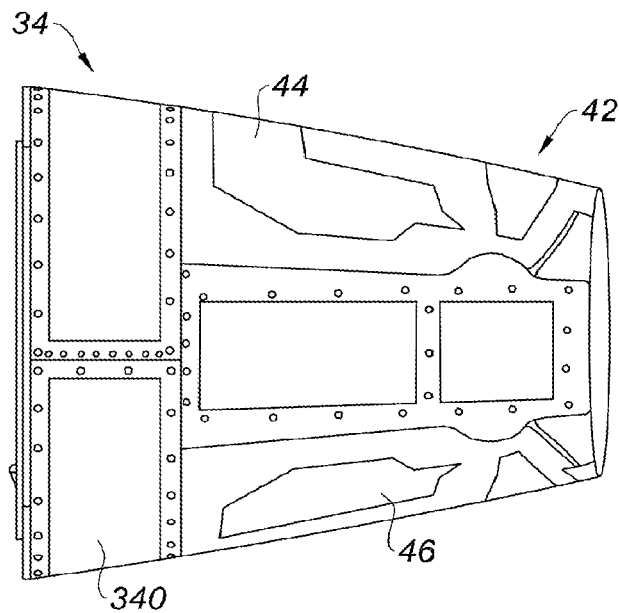
Figure 3B:
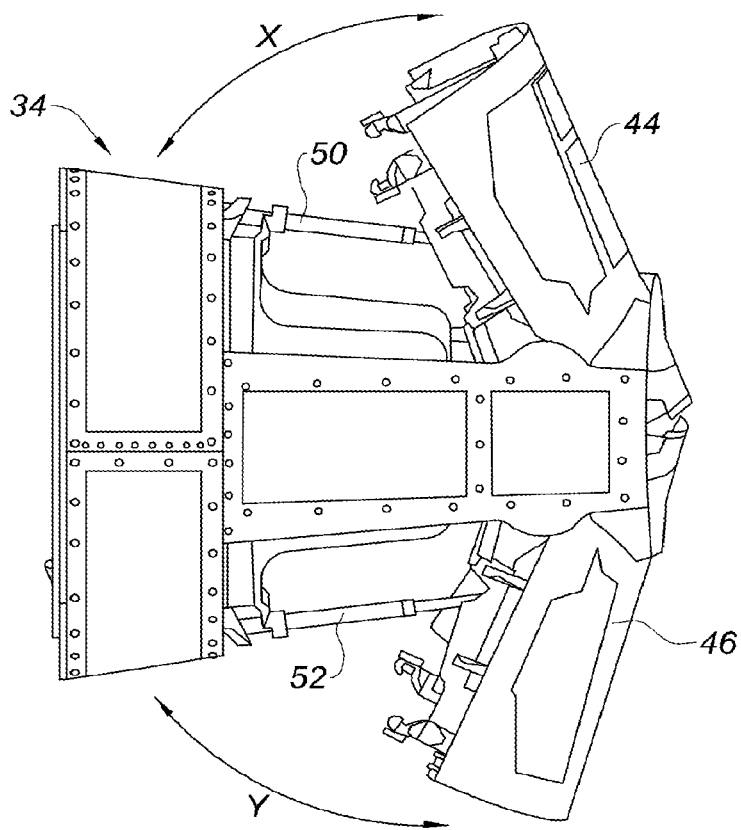
FIG. 3b is a side view of FIG. 2b.

FIGS. 2a and 2b are perspective views of the rear section 34 of the nacelle 3, the thrust reverser device 42 being respectively in the stowed position and in the deployed position. FIGS. 3a and 3b are side views corresponding to FIGS. 2a and 2b.

FIGS. 2a and 3a thus show the upper 44 and lower 46 doors in their stowed position, a position in which they provide an aerodynamic continuity with the rest of the rear section 34, vis-à-vis the outer surface 340 and vis-à-vis the inner surface 342 thereof. As visible more particularly in FIG. 3a, the doors are symmetrical relative to a plane containing the longitudinal axis of the nacelle.

FIGS. 2b and 3b show in turn the thrust reverser device 42 in its deployed position. It is therefore seen that the doors 44, 46 have pivoted, each actuated by a dedicated cylinder 50, 52, and are in a position in which they redirect forward the gas flows from the turbojet engine (hot or primary flow, and cold or secondary flow). As visible more particularly in FIG. 3b, due to the symmetrical positioning of the axes of rotation 48, 49 of the doors 44, 46, the rear (or downstream) edges of the doors 44, 46 are not offset along the longitudinal axis of the nacelle when the doors are in the deployed position.

In accordance with the present disclosure, the opening angle X of the upper door 44 (that is to say the angle between the stowed and deployed positions) is less than the opening angle Y of the lower door 46. Thus, the part of gas flow redirected downward (and therefore the thrust induced downward) by the lower door 46 is greater than the part of gas flow redirected upward (and therefore the thrust induced upward) by the upper door 44. As shown in FIG. 2b, the sum of thrusts generated by the doors 44, 46 in their deployed position (materialized by the arrow F3, the thrusts generated at each door being respectively materialized by the arrows F5 and F6) integrates a vertical component directed downward (materialized by the arrow F4). Thanks to this vertical component, an upward directed force is applied on the propulsion unit in the thrust reversal phases. Thus, when the propulsion unit 1 is located at the rear of the fuselage of an aircraft, behind the center of gravity of the aircraft, this upward directed force generates a nose-down pitching moment on the aircraft.

As specified above, the upper door 44 is actuated by an upper actuator 50, the lower door 46 being actuated by a lower actuator 52. As visible more particularly in FIG. 3b, the differentiated opening of the doors 44, 46 is obtained in the example by a differentiated stroke of both actuators 50, 52. Thus, the lower actuator 52 has a longer stroke than the upper actuator 50. The stroke difference will of course be provided in order to obtain the desired difference between the angles Y and X. In one example, the difference in opening angle between the doors 44, 46 is between 3° and 10°, and in another example is between 4° and 6°. The stroke of the lower actuator 52 being greater than that of the upper actuator 50, it can be considered that the first one is controlled in order to generate a deployment (and/or retraction) speed greater than that of the second one. Moreover, the arrangement of the actuators 50, 52 is symmetrical (relative to a plane containing the longitudinal axis of the engine), when the doors are in the stowed position. However, it will be possible to consider an asymmetrical positioning of the actuators, in which case the stroke of both actuators will not necessarily be differentiated.

Although the present disclosure has been described in connection with a particular example of one form, it is quite obvious that it is in no way limited thereto and that it comprises all the technical equivalents of the described means as well as the combinations thereof.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A nacelle for an aircraft bypass turbojet engine, the nacelle comprising:
    a rear section including a thrust reverser device, the thrust reverser device including an upper door and a lower door, the upper and lower doors being movable in rotation between a stowed position in which aerodynamic continuity with the nacelle is provided and a deployed position in which the upper and lower doors each form an opening angle with the nacelle redirecting a primary flow and a secondary flow generated by the aircraft bypass turbojet engine in a forward direction, the upper and lower doors being displaced from the stowed position to the deployed position by at least one upper actuator and one lower actuator respectively,
    wherein the opening angle of the upper door in the deployed position is less than the opening angle of the lower door, and
    wherein the lower and upper doors are movable in rotation about their respective axis of rotation, each axis of rotation being symmetrical relative to the longitudinal axis of the nacelle.

2. The nacelle according to claim 1, wherein the upper actuator has a smaller stroke than the lower actuator.

3. The nacelle according to claim 1, wherein the difference between the opening angle of the upper door and the opening angle of the lower doors is between 3° and 10°.

4. The nacelle according to claim 1, wherein the difference between the opening angle of the upper door and the opening angle of the lower door is between 4° and 6°.

5. The nacelle according to claim 1, wherein downstream edges of the upper and lower doors are aligned along a longitudinal axis of the nacelle when the upper and lower doors are in the deployed position.

6. An aircraft propulsion unit comprising an aircraft bypass turbojet engine and a nacelle according to claim 1.

7. An aircraft comprising at least one aircraft propulsion unit according to claim 6, the aircraft propulsion unit being attached to a fuselage of the aircraft in a rear position relative to a center of gravity of the aircraft.

* * * * *